(12) United States Patent
Xie et al.

(10) Patent No.: US 11,637,302 B2
(45) Date of Patent: Apr. 25, 2023

(54) PULSE HYDROGEN SUPPLY SYSTEM FOR PROTON EXCHANGE MEMBRANE FUEL CELL

(71) Applicant: HAIDRIVER (QINGDAO) ENERGY TECHNOLOGY CO., LTD, Shandong (CN)

(72) Inventors: Jiaping Xie, Shandong (CN); Shuai Hu, Shandong (CN); Yaochen Li, Shandong (CN); Wei Zhu, Shandong (CN)

(73) Assignee: HAIDRIVER (QINGDAO) ENERGY TECHNOLOGY CO., LTD, Shandong (CN)

( * ) Notice: Subject to any disclaimer, the term of this patent is extended or adjusted under 35 U.S.C. 154(b) by 0 days.

(21) Appl. No.: 17/563,064

(22) Filed: Dec. 28, 2021

(65) Prior Publication Data
US 2022/0285708 A1 Sep. 8, 2022

(30) Foreign Application Priority Data
Dec. 31, 2020 (CN) .......................... 202011620870.0

(51) Int. Cl.
| | |
|---|---|
| *H01M 8/04* | (2016.01) |
| *H01M 8/04746* | (2016.01) |
| *H01M 8/04089* | (2016.01) |
| *H01M 8/04119* | (2016.01) |
| *H01M 8/04082* | (2016.01) |
| *H01M 8/0438* | (2016.01) |

(52) U.S. Cl.
CPC ... *H01M 8/04753* (2013.01); *H01M 8/04104* (2013.01); *H01M 8/04164* (2013.01); *H01M 8/04201* (2013.01); *H01M 8/04388* (2013.01)

(58) Field of Classification Search
CPC ......... H01M 8/04753; H01M 8/04104; H01M 8/04164; H01M 8/04201; H01M 8/04388
See application file for complete search history.

(56) References Cited

FOREIGN PATENT DOCUMENTS

JP 2014154385 A * 8/2014

* cited by examiner

*Primary Examiner* — Olatunji A Godo
(74) *Attorney, Agent, or Firm* — JCIP Global Inc.

(57) ABSTRACT

A pulse hydrogen supply system for a proton exchange membrane fuel cell is provided. The system comprises a fuel cell, a high-pressure hydrogen bottle, a first pressure relief valve, an ejector, a steam-water separator, a first pressure control valve, a first pressure sensor, a high-pressure vessel, a first electromagnetic valve, a low-pressure vessel, a diaphragm pump, and a second electromagnetic valve. The high-pressure hydrogen bottle, the first pressure relief valve, the first pressure control valve, the ejector and the first pressure sensor are sequentially arranged on a gas inlet pipeline; the high-pressure vessel and the first electromagnetic valve are sequentially arranged on a branch pipeline; the second electromagnetic valve, the low-pressure vessel and the diaphragm pump are sequentially arranged on a first output loop; and the first output pipeline and the gas inlet pipeline form a loop.

5 Claims, 2 Drawing Sheets

PULSE HYDROGEN SUPPLY SYSTEM FOR PROTON EXCHANGE MEMBRANE FUEL CELL

CROSS-REFERENCE TO RELATED APPLICATION

This application claims the priority benefit of China application no. 202011620870.0, filed on Dec. 31, 2020. The entirety of the above-mentioned patent application is hereby incorporated by reference and made a part of this specification.

BACKGROUND

Technical Field

The present invention belongs to the technical field of fuel cells, and in particular relates to a pulse hydrogen supply system for a proton exchange membrane fuel cell.

Description of Related Art

A membrane electrode assembly of a proton exchange membrane fuel cell (PEMFC) must be kept wet for various monomers of the fuel cell to work effectively. A proton exchange membrane not only can play a role of electrolyte, but also can separate reactants (hydrogen and air). If the membrane is excessively dry in a certain area, an electrochemical reaction may stop. However, if the membrane is excessively wet to cause generation of water drops in a gas flow path, transfer of reactants may be hindered. Therefore, good humidification is necessary for the PEMFC, and redundant water must also be removed from the fuel cell. Water drops on the air side of the fuel cell are easier to remove due to higher gas flow on the air side of the fuel cell.

In the hydrogen supply system of the fuel cell, pulse discharge of hydrogen is mostly achieved through instantaneous boosting and dropping by a proportional valve in the prior art, however, the method is limited by the range of the proportional valve, the generated instantaneous pressure difference is small, and the purging effect on a hydrogen circuit of the fuel cell is poor. Meanwhile, the method may also increase the load on the proportional valve, the service life of the proportional valve is affected, and the control is inconvenient.

SUMMARY

The present invention provides a pulse hydrogen supply system for a proton exchange membrane fuel cell to overcome the problems of small instantaneous pressure difference, poor purging effect, influence on the service life of a proportional valve, difficulty in control and the like in hydrogen pulse discharge through instantaneous boosting and dropping by the proportional valve in the prior art.

A pulse hydrogen supply system for a proton exchange membrane fuel cell provided by the present invention comprises a fuel cell, a high-pressure hydrogen bottle, a first pressure relief valve, an ejector, a steam-water separator, a first pressure control valve, and a first pressure sensor, wherein the ejector is arranged on a gas inlet pipeline communicated between the high-pressure hydrogen bottle and an anode inlet of the fuel cell, the first pressure relief valve is arranged on the gas inlet pipeline adjacent to the high-pressure hydrogen bottle, the steam-water separator is arranged on a first output pipeline at an anode outlet of the fuel cell, the first pressure control valve is arranged at the gas inlet pipeline at a front end of the ejector, and the first pressure sensor is arranged on the gas inlet pipeline adjacent to the anode inlet of the fuel cell. On the basis of the prior art, the present invention is further improved as follows: the system further comprises a high-pressure vessel, a first electromagnetic valve, a low-pressure vessel, a diaphragm pump, and a second electromagnetic valve, wherein the high-pressure vessel is arranged on a branch pipeline of the gas inlet pipeline between the first pressure relief valve and the first pressure control valve, and the first electromagnetic valve is also arranged on the branch pipeline; the second electromagnetic valve, the low-pressure vessel and the diaphragm pump are sequentially arranged on the first output pipeline between the anode outlet of the fuel cell and the steam-water separator, and the first output pipeline and the gas inlet pipeline form a loop.

Preferably, a second pressure relief valve and a second pressure sensor are further arranged on the branch pipeline where the high-pressure vessel is located.

Preferably, the anode outlet of the fuel cell is connected to the ejector through a second output pipeline, and a third electromagnetic valve is arranged on the second output pipeline.

Preferably, the second output pipeline is further provided with a branch pipeline on which a fourth electromagnetic valve is arranged.

Preferably, the ejector is composed of three parts: a receiving chamber, a mixing chamber, and a diffuser; a nozzle is arranged in the receiving chamber, the receiving chamber is provided with a working fluid inlet and an ejector fluid inlet, and the working fluid inlet is connected to the nozzle.

The beneficial effects of the present invention are as follows:

in accordance with the present invention, two pressure wave generators are designed, the pressure of a high-pressure vessel is from a high-pressure hydrogen bottle, and the pressure of a low-pressure vessel is achieved through a diaphragm pump, thus the instantaneous pressure difference of a hydrogen loop can be effectively increased; by quickly opening a first electromagnetic valve and a second electromagnetic valve repeatedly, a diffusion layer between a flow channel and a membrane electrode assembly is dynamically affected by pressure waves, and repeated occurrence of expansion and contraction pressure waves contributes to removing unnecessary liquid from the membrane electrode assembly, thus the purging effect is better, good humidification of a membrane electrode assembly is guaranteed, and it is ensured that no abnormality occurs in the electrochemical reaction of the fuel cell. The pressure of the two pressure wave vessels designed in the present invention is well controlled, and instantaneous propagation of the pressure waves through the opening and closing of the electromagnetic valve is better controlled than instantaneous propagation of the pressure waves through a proportional valve. A branch pipeline of a gas inlet pipeline and a first output pipeline are used as a purging passage, a gas-liquid separator is arranged on the purging passage, and the purging passage is communicated with the gas inlet pipeline, so that hydrogen without water can be still circulated into the fuel cell to avoid the waste of hydrogen; in the purging process, a fourth electromagnetic valve is opened, inert gas (such as accumulated nitrogen) formed in the gas flow channel or a diffusion layer can be removed, which contributes to improving the performance of the fuel cell.

DESCRIPTION OF THE EMBODIMENTS

To make the objectives, technical solutions and advantages of the present invention more apparent, the present invention is further described in detail with reference to the accompanying drawings and examples. It should be understood that specific embodiments described here are merely used for explaining the present invention and cannot be construed as a limitation to the specific scope of protection of the present invention.

Embodiment

Figure 1:
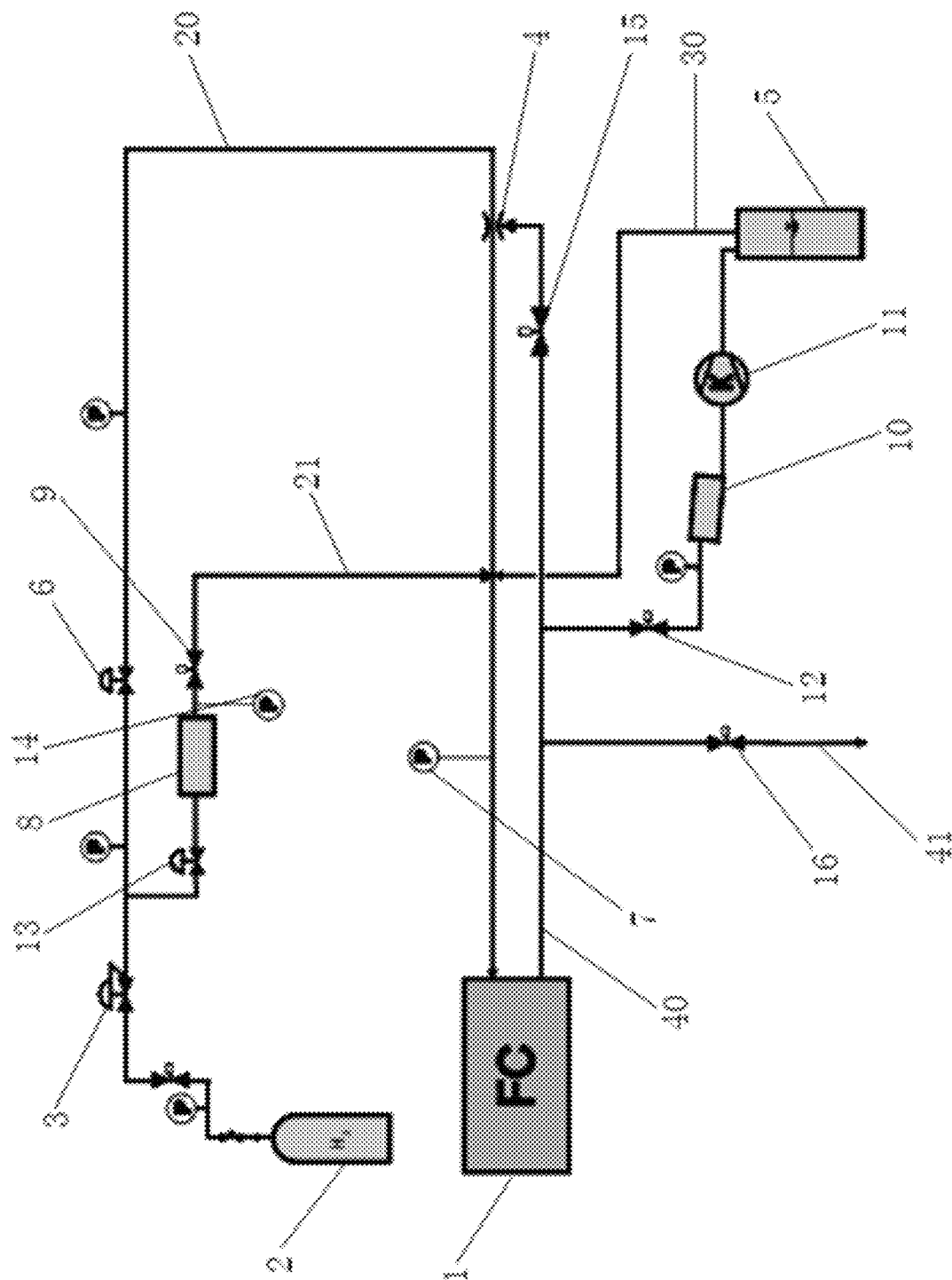
FIG. 1 is a structure diagram of a fuel pulse hydrogen supply system of the present invention.

Referring to FIG. 1, a pulse hydrogen supply system for a proton exchange membrane fuel cell provided by the embodiment comprises a fuel cell 1, a high-pressure hydrogen bottle 2, a first pressure relief valve 3, an ejector 4, a steam-water separator 5, a first pressure control valve 6, a first pressure sensor 7, a high-pressure vessel 8, a first electromagnetic valve 9, a low-pressure vessel 10, a diaphragm pump 11, and a second electromagnetic valve 12, wherein the ejector 4 is arranged on a gas inlet pipeline 20 communicated between the high-pressure hydrogen bottle 2 and an anode inlet of the fuel cell 1, the first pressure relief valve 3 is arranged on the gas inlet pipeline 20 adjacent to the high-pressure hydrogen bottle 2, the steam-water separator 5 is arranged on a first output pipeline 30 at an anode outlet of the fuel cell 1, the first pressure control valve 6 is arranged on the gas inlet pipeline 20 at a front end of the ejector 4, and the first pressure sensor 7 is arranged on the gas inlet pipeline 20 adjacent to the anode inlet of the fuel cell 1; the high-pressure vessel 8 is arranged on a branch pipeline 21 of the gas inlet pipeline 20 between the first pressure relief valve 3 and the first pressure control valve 6, and the first electromagnetic valve 3 is also arranged on the branch pipeline 21; the second electromagnetic valve 12, the low-pressure vessel 10 and the diaphragm pump 11 are sequentially arranged on the first output pipeline 30 between the anode outlet of the fuel cell 1 and the steam-water separator 5, and the first output pipeline 30 and the gas inlet pipeline 20 form a loop.

The high-pressure hydrogen bottle 2 is used for storing and supplying hydrogen, the first pressure relief valve 3 is used for depressurizing the hydrogen released from the high-pressure hydrogen bottle 2, and the pressure can be reduced from 200 bar to 8 bar at the maximum. To guarantee subsequent normal work of the ejector 4, an outlet of the first pressure relief valve 3 must be kept at a relatively high pressure. At a front end of the ejector 4, the first pressure control valve 6 controls the pressure at the anode inlet of the fuel cell 1 through a pressure signal collected by the first pressure sensor 7. Between the first pressure relief valve 3 and the first pressure control valve 6, a portion of the hydrogen is diverted and conveyed into the high-pressure vessel 8. On the first output pipeline 30, the hydrogen is periodically released into the low-pressure vessel 10 from the anode outlet of the fuel cell 1, the diaphragm pump 11 is used for creating a low-pressure environment for the low-pressure vessel 10, the pressure in the low-pressure container 10 is generally 20 kPa less than an operating pressure of the fuel cell 1, but the operating pressure of the fuel cell 1 is changed as a working condition changes, and is not fixed. When the hydrogen in the fuel cell 1 needs to be purged, the first electromagnetic valve 9 and the second electromagnetic valve 12 are quickly opened, and generated shock waves pass through the branch pipeline 21, the fuel cell 1 and the first conveying loop 30 at a high speed, so that any water drops possibly formed in the fuel cell 1 can be effectively purged into the steam-water separator 5 to be removed; and the hydrogen without water is still sent back to the gas inlet pipeline 20 to effectively prevent the problem of local hydrogen shortage in the fuel cell 1 and avoid the waste of hydrogen.

As a preferred embodiment of the embodiment, a second pressure control valve 13 and a second pressure sensor 14 are further arranged on the branch pipeline 21 where the high-pressure vessel 8 is located. The second pressure control valve 13 control the pressure in the high-pressure vessel 8 by using a pressure signal collected by the second pressure sensor 14. The pressure in the high-pressure vessel 8 is generally 20 kPa higher than the operating pressure of the fuel cell 1.

As a preferred embodiment of the embodiment, the anode outlet of the fuel cell 1 is connected to the ejector 4 through a second output pipeline 40, and a third electromagnetic valve 15 is arranged on the second output pipeline 40. The second output pipeline 40 serves to recirculate most of gas flow from the anode outlet of the fuel cell 1 to the ejector 4 and then to increase the hydrogen pressure to a level at the anode inlet of the fuel cell 1 to recirculate into the fuel cell 1. The third electromagnetic valve 15 is arranged on the second output pipeline 40 to prevent pressure waves from being propagated to the second output pipeline 40 during hydrogen purging. The third electromagnetic valve 15 remains an open state when hydrogen purging work is not conducted, and the third electromagnetic valve 15 needs to be closed when the hydrogen purging work is conducted.

As a preferred embodiment of the embodiment, the second output pipeline 40 is provided with a first branch pipeline 41, and a fourth electromagnetic valve 16 is arranged on the first branch pipeline 41. Inert gases necessarily accumulated in the system, such as accumulated nitrogen, can be eliminated through the first branch pipeline 41, which is conducive to improving the performance of the fuel cell 1.

Figure 2:
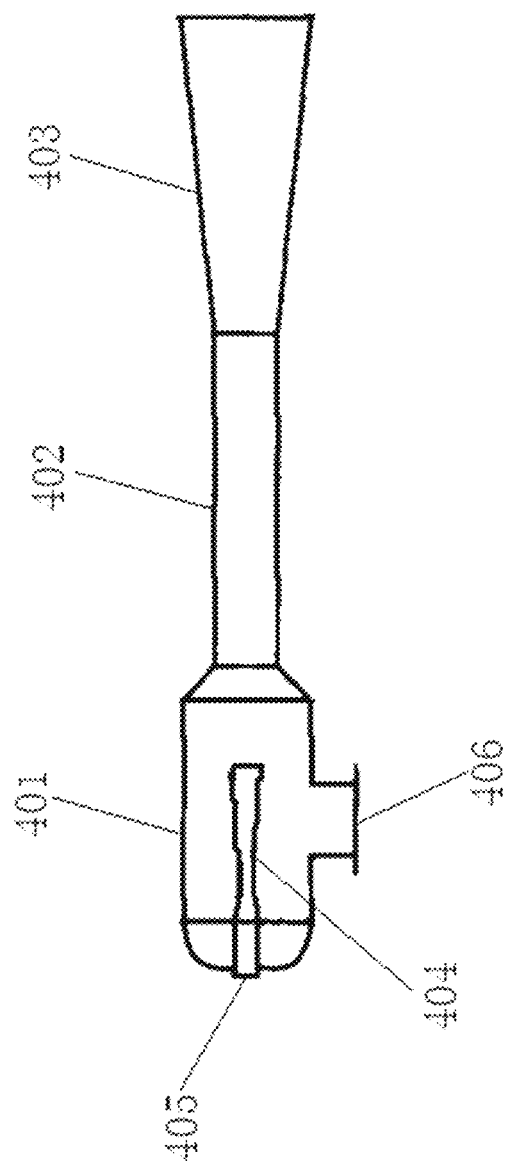
FIG. 2 is a structure diagram of an ejector of a fuel pulse hydrogen system of the present invention.

As a preferred embodiment of the embodiment, referring to FIG. 2, the ejector 4 is composed of three parts: a receiving chamber 401, a mixing chamber 402, and a diffuser 403; a nozzle 404 is arranged in the receiving chamber 401, the receiving chamber 401 is provided with a working fluid inlet 405 and an ejector fluid inlet 406, and the working fluid inlet 405 is connected to the nozzle 404. The working principle of the ejector 4 is as follows: when passing through the nozzle 404, high-pressure gas in the high-pressure hydrogen bottle 2 generates a low-pressure area in the receiving chamber 401 to entrain hydrogen which is not consumed completely from the anode outlet of the fuel cell 1, and then the hydrogen is conveyed to the anode inlet of the fuel cell 1 through the mixing chamber 402 and the diffuser 403. The function thereof is to mix two fluids with different pressures to form a mixed fluid with an intermediate pressure.

In accordance with the embodiment, two pressure wave generators (the high-pressure vessel, the first electromagnetic valve; the low-pressure container, the second electromagnetic valve) are designed, the pressure of the high-pressure vessel is from the high-pressure hydrogen bottle, and the pressure of the low-pressure vessel is achieved through the diaphragm pump, thus the instantaneous pressure difference of a hydrogen loop can be effectively increased; by quickly opening the first electromagnetic valve and the second electromagnetic valve repeatedly, generated shock waves pass through the hydrogen supply pipe and a fuel cell channel at a high speed, thus any water drops possibly formed in the fuel cell can be effectively removed, and extra hydrogen can be provided for the fuel cell to prevent the problem of local hydrogen shortage of the fuel cell.

What is claimed is:

1. A pulse hydrogen supply system for a proton exchange membrane fuel cell, comprising:
    a fuel cell, a high-pressure hydrogen bottle, a first pressure relief valve, an ejector, a steam-water separator, a first pressure control valve, and a first pressure sensor,
    wherein the ejector is arranged on a gas inlet pipeline communicated between the high-pressure hydrogen bottle and an anode inlet of the fuel cell,
    the first pressure relief valve is arranged on the gas inlet pipeline adjacent to the high-pressure hydrogen bottle,
    the steam-water separator is arranged on a first output pipeline at the anode outlet of the fuel cell,
    the first pressure control valve is arranged on the gas inlet pipeline at a front end of the ejector, and
    the first pressure sensor is arranged on the gas inlet pipeline adjacent to the anode inlet of the fuel cell,
    the pulse hydrogen supply system further comprises:
    a high-pressure vessel, a first electromagnetic valve, a low-pressure vessel, a diaphragm pump, and a second electromagnetic valve,
    wherein a pressure in the high-pressure vessel is higher than an operation pressure of the fuel cell and a pressure in the low-pressure vessel is less than the operation pressure of the fuel cell,
    wherein the high-pressure vessel is arranged on a branch pipeline of the gas inlet pipeline between the first pressure relief valve and the first pressure control valve, and
    the first electromagnetic valve is also arranged on the branch pipeline,
    the second electromagnetic valve, the low-pressure vessel and the diaphragm pump are sequentially arranged on the first output pipeline between the anode outlet of the fuel cell and the steam-water separator, and
    the first output pipeline and the gas inlet pipeline form a loop.

2. The pulse hydrogen supply system for the proton exchange membrane fuel cell according to claim 1, wherein a second pressure control valve and a second pressure sensor are further arranged on the branch pipeline where the high-pressure vessel is located.

3. The pulse hydrogen supply system for the proton exchange membrane fuel cell according to claim 1, wherein the anode outlet of the fuel cell is connected to the ejector through a second output pipeline, and a third electromagnetic valve is arranged on the second output pipeline.

4. The pulse hydrogen supply system for the proton exchange membrane fuel cell according to claim 3, wherein the second output pipeline is further provided with a branch pipeline on which a fourth electromagnetic valve is arranged.

5. The pulse hydrogen supply system for the proton exchange membrane fuel cell according to claim 1, wherein the ejector is composed of three parts:
    a receiving chamber, a mixing chamber, and a diffuser,
    wherein a nozzle is arranged in the receiving chamber, the receiving chamber is provided with a working fluid inlet and an ejector fluid inlet, and the working fluid inlet is connected to the nozzle,
    wherein the receiving chamber is configured to entrain hydrogen which is not consumed from the anode outlet of the fuel cell and the mixing chamber is configured to mix different fluids with different pressures from the working fluid inlet and the ejector fluid inlet to form a mixed fluid with an intermediate pressure.

* * * * *